United States Patent
Wan et al.

(10) Patent No.: US 11,263,007 B2
(45) Date of Patent: Mar. 1, 2022

(54) CONVOLUTIONAL NEURAL NETWORK HARDWARE ACCELERATION DEVICE, CONVOLUTIONAL CALCULATION METHOD, AND STORAGE MEDIUM

(71) Applicant: NATIONZ TECHNOLOGIES INC., Guangdong (CN)

(72) Inventors: Wentao Wan, Guangdong (CN); Jie Liang, Guangdong (CN); Hua Xie, Guangdong (CN); Cong Luo, Guangdong (CN)

(73) Assignee: NATIONZ TECHNOLOGIES INC., Guangdong (CN)

( * ) Notice: Subject to any disclaimer, the term of this patent is extended or adjusted under 35 U.S.C. 154(b) by 22 days.

(21) Appl. No.: 16/958,752

(22) PCT Filed: Jan. 18, 2018

(86) PCT No.: PCT/CN2018/073174
§ 371 (c)(1),
(2) Date: Jun. 29, 2020

(87) PCT Pub. No.: WO2019/127731
PCT Pub. Date: Jul. 4, 2019

(65) Prior Publication Data
US 2020/0341758 A1     Oct. 29, 2020

(30) Foreign Application Priority Data
Dec. 29, 2017   (CN) .......................... 201711486052.4

(51) Int. Cl.
*G06F 9/30*     (2018.01)
*G06F 9/38*     (2018.01)
*G06N 3/063*    (2006.01)

(52) U.S. Cl.
CPC ...... *G06F 9/30007* (2013.01); *G06F 9/30101* (2013.01); *G06F 9/30145* (2013.01); *G06F 9/3802* (2013.01); *G06N 3/063* (2013.01)

(58) Field of Classification Search
CPC . G06N 3/063; G06F 9/30007; G06F 9/30145; G06F 9/3802
See application file for complete search history.

(56) References Cited

U.S. PATENT DOCUMENTS

| | | | |
|---|---|---|---|
| 2017/0205863 A1* | 7/2017 | Lee | .......................... G06F 1/324 |
| 2017/0236053 A1 | 8/2017 | Lavigueur et al. | |
| 2018/0046903 A1* | 2/2018 | Yao | ........................ G06N 3/082 |

FOREIGN PATENT DOCUMENTS

| CN | 105611114 A | 5/2016 |
|---|---|---|
| CN | 106940815 A | 7/2017 |

(Continued)

*Primary Examiner* — Zachary K Huson
(74) *Attorney, Agent, or Firm* — Yu Gang (57) ABSTRACT

A convolutional neural network hardware acceleration device, a convolutional calculation method, and a storage medium are provided. The device includes an instruction processing element (1), a hardware acceleration component (2), and an external data memory element (3). The instruction processing element (1) decodes instructions, and controls the hardware acceleration component (2) to perform operations corresponding to decoded instructions. The hardware acceleration component (2) includes: an input buffer element (21), a data calculation element (22) and an output buffer element (23). The external data memory element (3) stores the calculation result output by the output buffer element (23) and transmits the data to the input buffer element (21).

9 Claims, 4 Drawing Sheets

(56) References Cited

FOREIGN PATENT DOCUMENTS

| CN | 106991477 A | 7/2017 |
| CN | 107315715 A | 11/2017 |
| CN | 107329936 A | 11/2017 |
| JP | 2015210709 A | 11/2015 |

* cited by examiner

| Operation code | Status register | Register or immediate number | Register or immediate number | ... |
|---|---|---|---|---|

CONVOLUTIONAL NEURAL NETWORK HARDWARE ACCELERATION DEVICE, CONVOLUTIONAL CALCULATION METHOD, AND STORAGE MEDIUM

TECHNICAL FIELD

The present disclosure relates to the technical field of computers, and in particular to an instruction set-controlled convolutional neural network hardware acceleration device and a convolutional calculation method.

BACKGROUND

In recent years, with the increasing popularity of artificial intelligence, more deep learning algorithm models have been proposed by people to solve current research problems. However, with a deepening of deep learning algorithm research, various models with more layers and more complex structures have been proposed. None relatively complete theoretical system has been provided yet, but deep learning algorithms are still advancing. Therefore, since it is difficult to change architecture of a dedicated deep learning algorithm model realized by current terminal hardware, reprogram is inevitable.

In related art, one mode is to use a general-purpose processor to process deep learning algorithms. Although this mode is quite general and an instruction set is mature and perfect, it is inefficient when processing a large number of parallel calculations, and data communication bandwidth requirements between various components are large, thereby making this mode difficult to adapt to deep learning algorithms with high parallelism.

Another mode is to use a graphics processor to process deep learning algorithms. Although this mode has great data parallelism and a relatively mature instruction set, a large amount of power is consumed, an on-chip memory is little, and off-chip bandwidth requirements are large when performing large-scale data calculations.

In addition, another mode is to design a general-purpose deep learning processor instruction set. This mode achieves more flexible support for different deep learning algorithms for hardware implementation, but this technology is currently immature. Since universality of different types of deep learning algorithms should be met, it is more complex in structure and instruction design. And a processing effect in a certain aspect is not as direct as a dedicated deep learning processing instruction, and artificial intelligence of an embedded terminal needs simpler and more targeted instruction operations.

It can be seen that a general instruction set is not suitable for dedicated embedded artificial intelligence hardware, while a dedicated embedded artificial intelligence instruction set makes the dedicated embedded artificial intelligence hardware have certain generality and programmability, and the instruction structure design is simple and strongly targeted.

Therefore, starting from a dedicated embedded artificial intelligence instruction set, the present disclosure provides an instruction set-controlled convolutional neural network hardware acceleration device and a convolutional calculation method applied to machine vision.

SUMMARY

At least some embodiments of the present disclosure provide an instruction set-controlled convolutional neural network hardware acceleration device and a convolutional calculation method, so as at least to partially solve problems of insufficient parallel calculation, insufficient on-chip storage, complicated instructions, and insufficient targeted effects in the related art.

An embodiment of the present disclosure provides a convolutional neural network hardware acceleration device. The device includes an instruction processing element, a hardware acceleration component, and an external data memory element.

The instruction processing element is configured to decode instructions, and control the hardware acceleration component to perform operations corresponding to decoded instructions.

The hardware acceleration component includes an input buffer element, an output buffer element, and a data calculation element.

The Input buffer element is configured to perform a memory access operation controlled by the instruction processing element to store data read from the external data memory element.

The data calculation element is configured to perform an operational execution operation controlled by the instruction processing element to process a data calculation of an inference part of a convolutional neural network, and control a data calculation process and a data flow direction according to calculation instructions.

The output buffer element is configured to perform a memory access operation controlled by the instruction processing element to store a calculation result which is to be written into the external data memory element and is output by the data calculation element.

The external data memory element is configured to store the calculation result output by the output buffer element and transmit the data to the input buffer element.

In some embodiments, the instruction processing element includes:

an instruction queue component, configured to store the instructions;

an instruction fetch component, configured to sequentially fetch the instructions in the instruction queue component;

a decoding component, configured to decode the instructions fetched from the instruction fetch component;

an instruction sequence component, configured to buffer the instructions decoded by the decoding component; and an execution component, configured to execute the decoded instructions buffered by the instruction sequence component to control the hardware acceleration component to perform corresponding operations.

In some embodiments, the data calculation element includes at least one calculation element, and each calculation element is configured to select calculation operations containing at least one of multiply-accumulation, addition, subtraction, multiplication, and division according to an instruction decoding result.

In some embodiments, the calculation element includes a multiplier or multiply accumulator, an adder, a subtractor, a divider, a comparator, and an output data selection element.

The multiplier or multiply accumulator is configured to implement a multiply-accumulate or multiply operation, and the multiplier or multiply-accumulator internally includes a temporary storage register for storing a temporary value after the multiply-accumulate or multiply operation.

The adder is configured to implement an addition operation, and the adder includes a temporary storage register for storing a temporary value after the addition operation.

The subtractor is configured to implement a subtraction operation, and the subtractor includes a temporary storage register for storing a temporary value after the subtraction operation.

The divider is configured to implement a division operation, and the divider includes a temporary storage register for storing a temporary value after the division operation.

The comparator is configured to implement a comparison operation, and the comparator includes a temporary storage register for storing a temporary value after the comparison operation.

The output data selection element is configured to select and output data of one of the multiplier or multiply accumulator, the adder, the subtractor, the divider, and the comparator according to an output data selection signal of a decoding result obtained by the instruction processing element.

In another embodiment of the present disclosure, a method for convolutional calculation using the convolutional neural network hardware acceleration device includes the following steps:

Step S1, an instruction processing element decodes instructions, and sends decoded instructions to a hardware acceleration component;

Step S2, an input buffer element reads weight data and input data from an external data memory element according to the decoded instructions;

Step S3, the input buffer element transports the input data to one end of a selected operator of a calculation element and the weight data to the other end of the selected operator according to a selection signal of the calculation element;

Step S4, a data calculation element performs a calculation operation according to the decoded instructions, adds a calculation result of each selected operator to data stored in a temporary storage register of this selected operator to obtain an addition result, and stores the addition result to the corresponding temporary storage register;

Step S5, after the calculation operation performed each selected operator is completed, an on-chip storage element stores a result of one feature point of an output feature map on one channel obtained by the temporary storage register at a corresponding address, and after the calculation operation of each selected operator is completed, a convolutional calculation between a feature map and a weight of a channel is completed; and Step S6, when data of all channels is calculated and stored on the on-chip storage element after the operation of all calculation elements is completed, a convolutional operation of multi-channel data and a convolution sum is completed, and the data calculation element stores output data to an external data memory element through an output buffer element.

In some embodiments, in Step S1, a manner of decoding the instructions by the instruction processing element includes the following steps:

an instruction queue component stores the instructions;

an instruction fetch component sequentially fetches an instruction combination in the instruction queue component according to content of convolutional neural calculation;

a decoding component decodes the instruction combination fetched from the instruction fetch component;

an instruction sequence component buffers decoded instructions in the instruction combination decoded by the decoding component; and an execution component sequentially executes the decoded instructions buffered by the instruction sequence component, and controls the hardware acceleration component to perform operations corresponding to the decoded instructions.

In some embodiments, in Step S1, the instructions are obtained from an instruction set, and the instruction set includes:

data interaction instructions, which are used for performing data transportation operations including data reading, data storage, and data transfer and assignment in a device;

data calculation instructions, which are used for performing data parallel batch calculation operations including multiply-accumulation, addition, subtraction, multiplication, and division in a data convolutional calculation process; and control logic instructions, which are used for performing control logic operations to control a data calculation process.

The data interaction instructions, the data calculation instructions, and the control logic instructions form different simple instruction combinations according to different convolutional neural calculations, so as to control the hardware acceleration component performs convolutional calculation.

In some embodiments, in Step S1, the instruction processing element sends a current instruction, when the current instruction has a dependency relationship with a previous instruction, the current instruction is performed after the previous instruction has been executed, when the instruction queue component is fully buffered, the instruction queue component returns a full writing status to, forbid the instruction fetch component from continuously reading any subsequent instruction, and the instruction fetch component continuously reads the subsequent instruction after the instructions in the instruction queue component are executed.

Each instruction in the instruction processing element in Step S1 at least includes one operation code, one status register, and one operation domain.

The operation code is used for indicating different kinds of operations performed.

The status register is configured to indicate different operation modes under the same operation code.

The operation domain is represented by an immediate value or a register.

The operation code, the status register, and the operation domain are sequentially coded into one instruction.

In another embodiment of the present disclosure, a computer-readable storage medium is provided, which stores a processor program that, when executed by a computer, implements the following steps:

Step S1, an instruction processing element decodes instructions, and sends decoded instructions to a hardware acceleration component;

Step S2, an input buffer element reads weight data and input data from an external data memory element according to the decoded instructions;

Step S3, the input buffer element transports the input data to one end of a selected operator of a calculation element and the weight data to the other end of the selected operator according to a selection signal of the calculation element;

Step S4, a data calculation element performs a calculation operation according to the decoded instructions, adds a calculation result of each selected operator to data stored in a temporary storage register of this selected operator to obtain an addition result, and stores the addition result to the corresponding temporary storage register;

Step S5, after the calculation operation performed each selected operator is completed, an on-chip storage element stores a result of one feature point of an output feature map on one channel obtained by the temporary storage register at a corresponding address, and after the calculation operation of each selected operator is completed, a convolutional calculation between a feature map and a weight of a channel is completed; and Step S6, when data of all channels is calculated and stored on the on-chip storage element after the operation of all calculation elements is completed, a convolutional operation of multi-channel data and a convolution sum is completed, and the data calculation element stores output data to an external data memory element through an output buffer element.

In some embodiments, in the computer-readable storage medium, in Step S1, a manner of decoding the instructions by the instruction processing element includes the following steps:

an instruction queue component stores the instructions;

an instruction fetch component sequentially fetches an instruction combination in the instruction queue component according to content of convolutional neural calculation;

a decoding component decodes the instruction combination fetched from the instruction fetch component;

an instruction sequence component buffers decoded instructions in the instruction combination decoded by the decoding component; and an execution component sequentially executes the decoded instructions buffered by the instruction sequence component, and controls the hardware acceleration component to perform operations corresponding to the decoded instructions.

In Step S1, the instruction processing element sends a current instruction, when the current instruction has a dependency relationship with a previous instruction, the current instruction is performed after the previous instruction has been executed, when the instruction queue component is fully buffered, the instruction queue component returns a full writing status to, forbid the instruction fetch component from continuously reading any subsequent instruction, and the instruction fetch component continuously reads the subsequent instruction after the instructions in the instruction queue component are executed.

In Step S1, the instructions are obtained from an instruction set, and the instruction set includes:

data interaction instructions, which are used for performing data transportation operations comprising data reading, data storage, and data transfer and assignment in a device;

data calculation instructions, which are used for performing data parallel batch calculation operations comprising multiply-accumulation, addition, subtraction, multiplication, and division in a data convolutional calculation process;

control logic instructions, which are used for performing control logic operations to control a data calculation process.

The data interaction instructions, the data calculation instructions, and the control logic instructions form different simple instruction combinations according to different convolutional neural calculations, so as to control the hardware acceleration component performs convolutional calculation.

Each instruction in the instruction processing element in Step S1 at least includes one operation code, one status register, and one operation domain.

The operation code is used for indicating different kinds of operations performed.

The status register is configured to indicate different operation modes under the same operation code.

The operation domain is represented by an immediate value or a register.

The operation code, the status register, and the operation domain are sequentially coded into one instruction.

The at least some embodiments present disclosure have following technical benefits.

In the convolutional neural network acceleration device, the convolutional calculation method and the storage medium of the present disclosure, a convolutional neural network model is executed, so that the high efficiency of dedicated embedded artificial intelligence is maintained while the generality and configurability of dedicated embedded artificial intelligence hardware are increased. The instructions are simple, directly facing the process of batch data access, circulation, and operation, which increases the efficiency of convolutional calculation.

DETAILED DESCRIPTION

The specific implementation manners of the present disclosure will be described in more detail in conjunction with the accompanying drawings and embodiments in order to better understand the solutions of the present disclosure and the advantages of various aspects thereof. However, the specific implementation manners and embodiments described below are for illustrative purposes, and are not intended to limit the present disclosure.

Figure 1:
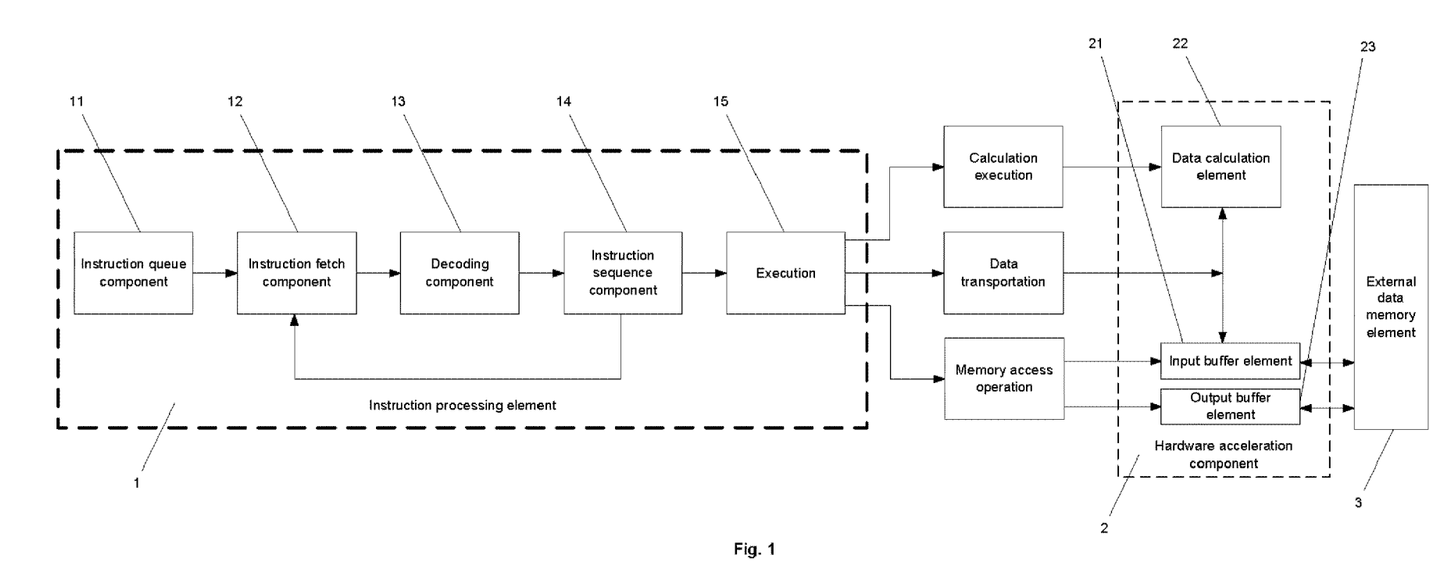
FIG. 1 is a schematic structural diagram of a convolutional neural network acceleration device.

The present disclosure relates to a convolutional neural network hardware acceleration device, a convolutional calculation method, and a storage medium. As shown in FIG. 1, FIG. 1 is a schematic structural diagram of a convolutional neural network acceleration device.

The device includes an instruction processing element 1, a hardware acceleration component 2, and an external data memory element 3. The instruction processing element 1 is configured to decode instructions, and control the hardware acceleration component 2 to perform operations corresponding to decoded instructions. The hardware acceleration component 2 includes an input buffer element 21, an output buffer element 22, and a data calculation element 23. The input buffer element 21 is configured to perform a memory access operation controlled by the instruction processing element 1 to store data read from the external data memory element 3. A buffer area is composed of on-chip registers, which read and output scalar, vector or matrix data to the data calculation element 22, and are flexibly configured according to the instructions. The data calculation element 22 is configured to perform an operational execution operation controlled by the instruction processing element 1 to process a data calculation of an inference part of a convolutional neural network. The calculation operations are multiply-accumulation, addition, subtraction, multiplication, division, comparison, and read and write operations executed on an in-chip storage element. Each operation is oriented to parallel data batch processing, and a data calculation process and a data flow direction are controlled according to a calculation instruction set. The output buffer element 23 is configured to perform a memory access operation of the instruction processing element 1 to store a calculation result which is to be written into the external data memory element 3 and is output by the data calculation element 22. The buffer area is composed of on-chip registers, which store a result output by the data calculation element 22 and write the result into a memory, and are flexibly configured according to the instructions. The external data memory element 3 is configured to store the calculation result output by the output buffer element 23 and transmit the data to the input buffer element 21.

The instruction processing element 1 directly drives a hardware device through control logic instructions, control data interaction instructions, and data calculation instructions to implement a convolutional neural network model.

The Instruction processing element 1 includes: an instruction queue component 11, configured to store the instructions in the instruction set; an instruction fetch component 12, configured to sequentially fetch the instructions in the instruction queue component 11; a decoding component 13, configured to decode the instructions fetched from the instruction fetch component 12; an instruction sequence component 14, configured to buffer the instructions decoded by the decoding component 13; and an execution component 15, configured to execute the decoded instructions buffered by the instruction sequence component 14 to control the hardware acceleration component 2 to perform corresponding operations.

Figure 2:
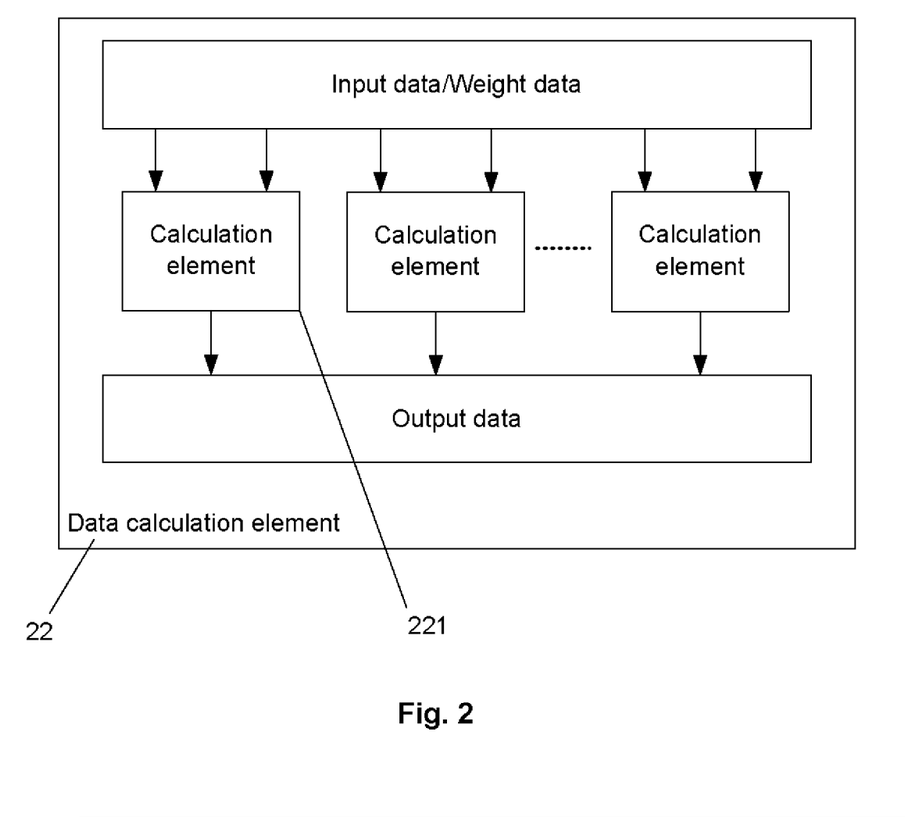
FIG. 2 is a schematic structural diagram of a data calculation element.

FIG. 2 is a schematic structural diagram of a data calculation element 22. As shown in FIG. 2, the data calculation element 22 includes at least one calculation element, and each calculation element has the same structure and is configured to select calculation operations containing at least one of multiply-accumulation, addition, subtraction, multiplication, and division according to an instruction decoding result.

Figure 3:
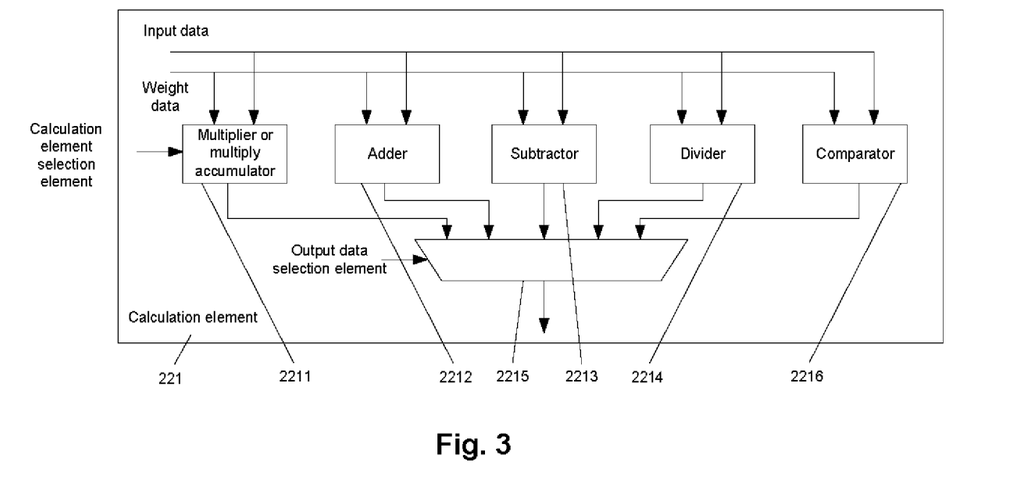
FIG. 3 is a schematic structural diagram of a calculation element.

FIG. 3 is a schematic structural diagram of a calculation element 221. As shown in FIG. 3, the calculation element 221 includes a multiplier or multiply accumulator 2211, an adder 2212, a subtractor 2213, a divider 2214, a comparator 2216, and an output data selection element 2215. The multiplier or multiply accumulator 2211 is configured to implement a multiply-accumulate or multiply operation. The adder 2212 is configured to implement an addition operation. The subtractor 2213 is configured to implement a subtraction operation. The divider 2214 is configured to implement a division operation. The comparator 2216 is configured to implement a comparison operation. The output data selection element 2215 is configured to select and output data of one of the multiplier or multiply accumulator 2211, the adder 2212, the subtractor 2213, the divider 2214, and the comparator 2216 according to an output data selection signal of a decoding result obtained by the instruction processing element 1.

The operators including the multiplier or multiply accumulator, the adder, the subtractor, the divider, and the comparator internally Include temporary storage registers for storing temporary values after the calculation operations.

The instruction set includes three classes of functional instructions: data interaction instructions, which are used for performing data transportation operations including data reading, data storage, and data transfer and assignment in a device; data calculation instructions, which are used for performing data parallel batch calculation operations including multiply-accumulation, addition, subtraction, multiplication, and division in a data convolutional calculation process; and control logic instructions, which are used for performing control logic operations to control a data calculation process. The data interaction instructions, the data calculation instructions, and the control logic instructions form different simple instruction combinations according to different convolutional neural calculations, so as to control the hardware acceleration component 2 performs convolutional calculation. As shown in Table 1, Table 1 is an instruction set description table.

The data interaction instruction includes the following instructions.

Data load instruction (DLOAD), according to this instruction, the device is configured to load scalar, vector or matrix data from a memory into a corresponding input data buffer area for subsequent data calculations, and this instruction is set as an instruction for data interaction between the device and the memory.

Data transportation instruction (DMOVE), according to this instruction, the device is configured to transport data inside the device to a position to be used, transport scalar, vector, and matrix data, and perform the corresponding data calculation operation after the data is ready.

TABLE 1

| Instruction type | Instruction | Description |
| --- | --- | --- |
| Data interaction instruction (data) | DLOAD | Load data from memory, which may load scalar, vector and matrix data |
| | DMOVE | Internal data transportation instruction, which may transport scalar, vector and matrix data |
| | DSTORE | Data storage into memory, which may store scalar, vector and matrix data |
| Data calculation instruction (calculation) | OMUL | Multiplication of vector by scalar, vector by vector, vector by matrix, matrix by scalar, and matrix by matrix |
| | OADD | Addition of vector to scalar, vector to vector, matrix to scalar, and matrix to matrix |
| | OSUB | Subtraction of vector from scalar, vector from vector, matrix from scalar, and matrix from matrix |
| | ODIV | Division of vector by scalar and matrix by scalar |
| | OCMP | Parallel comparison operation, supporting maximum pooling operation and activation function leaky |
| Control logic instruction (control) | CJUMP | Control jump instruction, jumping to a mark for instruction execution |
| | CSUB | Data subtraction operation of control register |
| | CADD | Data addition operation of control register |
| | CMOV | Data assignment operation of control register |

Data storage instruction (DSTORE), according to this instruction, the device is configured to store the scalar, vector or matrix data of an output data buffer into the memory.

The data calculation instruction includes the following instructions.

Data multiplication instruction (OMUL), according to this instruction, a parallel multiplier inside the device is configured to perform parallel multiplication operation on the corresponding input data and output an operation result, and complete parallel multiplication of vector by scalar, vector by vector, vector by matrix, matrix by scalar, and matrix by matrix.

Data addition instruction (OADD), according to this instruction, a parallel adder inside the device is configured to perform parallel addition operation on the corresponding input data and output an operation result, and complete parallel addition of vector to scalar, vector to vector, matrix to scalar, and matrix to matrix.

Data subtraction instruction (OSUB), according to this instruction, a parallel subtractor inside the device is configured to perform parallel subtraction operation on the corresponding input data and output an operation result, and complete parallel subtraction of vector from scalar, vector from vector, matrix from scalar, and matrix from matrix.

Data division instruction (ODIV), according to this instruction, a parallel divider inside the device is configured to perform parallel division operation on the corresponding input data and output an operation result, and complete parallel division of vector by scalar and matrix by scalar.

Data comparison instruction (OCMP), according to this instruction, a parallel comparator inside the device is configured to compare the data input into the corresponding comparator sequentially, and output the results of multiple comparisons in parallel respectively, so that parallel processing of a maximum pooling operation and an activation function leaky are completed.

The control logic instruction includes the following instructions.

Control jump instruction (CJUMP), according to this instruction, the jump direction of the instruction is controlled. When the control register is not equal to a certain predetermined value, the instruction jumps, the instruction jumping to a mark is executed sequentially. And when the control register is equal to a certain predetermined value, the instruction does not jump and will continue to execute in the original sequence.

Control subtraction instruction (CSUB), according to this instruction, the subtraction operation of a special register inside the device is configured to change a current value of the special register.

Control addition instruction (CADD), according to this instruction, the addition operation of a special register inside the device is configured to change a current value of the special register.

Control assignment instruction (CMOV), according to this instruction, the assignment operation of a special register inside the device is configured to assign an initial value of the special register.

Figure 4:
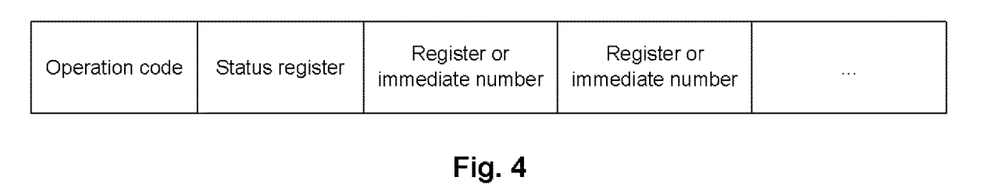
FIG. 4 is a schematic diagram of a format of an instruction set.

FIG. 4 is a schematic diagram of a format of an instruction set. As shown in FIG. 4, the instruction at least includes one operation code, one status register, and one operation domain. The operation code is used for indicating different kinds of operations. The status register is configured to indicate different operation modes under the same operation code. The operation domain is represented by an immediate value or a register. The operation code, the status register, and the operation domain are sequentially coded into one instruction.

A manner of processing an instruction by the instruction processing element 1 includes the following steps.

The instruction queue component 11 stores the instructions.

The instruction fetch component 12 sequentially fetches an instruction combination in the instruction queue component according to content of convolutional neural calculation.

The decoding component 13 decodes the instruction combination fetched from the instruction fetch component.

The instruction sequence component 14 buffers decoded instructions in the instruction combination decoded by the decoding component.

And the execution component 15 sequentially executes the decoded instructions buffered by the instruction sequence component, and controls the hardware acceleration component 2 to perform operations corresponding to the decoded instructions.

The instruction processing element 1 sends a current instruction, when the current instruction has a dependency relationship with a previous instruction, the current instruction is performed after the previous instruction has been executed. When the instruction queue component 11 is fully buffered, the instruction queue component returns a full writing status to, forbid the instruction fetch component from continuously reading any subsequent instruction, and the instruction fetch component continuously reads the subsequent instruction after the instructions in the instruction queue component 11 are executed.

A method for convolutional calculation using the convolutional neural network hardware acceleration device provided by the present disclosure includes the following steps.

In Step S1, the instruction processing element 1 decodes instructions, and sends decoded instructions to the hardware acceleration component 2.

In Step S2, the input buffer element 21 reads weight data and input data from the external data memory element 3 according to the decoded instructions.

In Step S3, the input buffer element 21 transports the input data to one end of a selected operator of a calculation element and the weight data to the other end of the selected operator according to a selection signal of the calculation element.

In Step S4, the data calculation element 1 performs a calculation operation according to the decoded instructions, adds a calculation result of each selected operator is added to data stored in a temporary storage register of this selected operator to obtain an addition result, and stores the addition result to the corresponding temporary storage register.

In Step S5, after the calculation operation performed each selected operator is completed, an on-chip storage element stores a result of one feature point of an output feature map on one channel obtained by the temporary storage register at a corresponding address, and after the calculation operation of each selected operator is completed, a convolutional calculation between a feature map and a weight of a channel is completed.

In Step S6, when data of all channels is calculated and stored on the on-chip storage element after the operation of all calculation elements is completed, a convolutional operation of multi-channel data and a convolution sum is completed, and the data calculation element 22 stores output data to an external data memory element 3 through the output buffer element 23.

The present disclosure further provides a computer-readable storage medium, which stores a processor program. When executed by a computer, the program implements the following steps.

In Step S1, the instruction processing element 1 decodes instructions, and sends decoded instructions to the hardware acceleration component 2.

In Step S2, the input buffer element 21 reads weight data and input data from the external data memory element 3 according to the decoded instructions.

In Step S3, the input buffer element 21 transports the input data to one end of a selected operator of a calculation element and the weight data to the other end of the selected operator according to a selection signal of the calculation element.

In Step S4, the data calculation element 1 performs a calculation operation according to the decoded instructions, adds a calculation result of each selected operator is added to data stored in a temporary storage register of this selected operator to obtain an addition result, and stores the addition result to the corresponding temporary storage register.

In Step S5, after the calculation operation performed each selected operator is completed, an on-chip storage element stores a result of one feature point of an output feature map on one channel obtained by the temporary storage register at a corresponding address, and after the calculation operation of each selected operator is completed, a convolutional calculation between a feature map and a weight of a channel is completed.

In Step S6, when data of all channels is calculated and stored on the on-chip storage element after the operation of all calculation elements is completed, a convolutional operation of multi-channel data and a convolution sum is completed, and the data calculation element 22 stores output data to an external data memory element 3 through the output buffer element 23.

In some embodiments, in the computer-readable storage medium, in Step S1, a manner of decoding the instructions by the instruction processing element includes the following steps.

The instruction queue component 11 stores the instructions.

The Instruction fetch component 12 sequentially fetches an instruction combination in the instruction queue component 11 according to content of convolutional neural calculation.

The decoding component 13 decodes the instruction combination fetched from the instruction fetch component 12.

The instruction sequence component 14 buffers decoded instructions in the instruction combination decoded by the decoding component 13.

The execution component 15 sequentially executes the decoded instructions buffered by the instruction sequence component 14, and controls the hardware acceleration component 2 to perform operations corresponding to the decoded instructions.

In step S1, the instruction processing element 1 sends a current instruction, when the current instruction has a dependency relationship with a previous instruction, the current instruction is performed after the previous instruction has been executed. When the instruction queue component 11 is fully buffered, the instruction queue component returns a full writing status to, forbid the instruction fetch component from continuously reading any subsequent instruction, and the instruction fetch component continuously reads the subsequent instruction after the instructions in the instruction queue component 11 are executed.

In Step S1, the instructions are obtained from an instruction set, and the instruction set includes:

data interaction instructions, which are used for performing data transportation operations including data reading, data storage, and data transfer and assignment in a device;

data calculation instructions, which are used for performing data parallel batch calculation operations including multiply-accumulation, addition, subtraction, multiplication, and division in a data convolutional calculation process; and control logic instructions, which are used for performing control logic operations to control a data calculation process.

The data interaction instructions, the data calculation instructions, and the control logic instructions form different simple instruction combinations according to different convolutional neural calculations, so as to control the hardware acceleration component performs convolutional calculation.

Each Instruction in the instruction processing element in Step S1 at least includes one operation code, one status register, and one operation domain.

The operation code is used for indicating different kinds of operations.

The status register is configured to indicate different operation modes under the same operation code.

The operation domain is represented by an immediate value or a register.

The operation code, the status register, and the operation domain are sequentially coded into one instruction.

Embodiment

The present disclosure is used for convolutional calculation, and the present disclosure provides the following embodiments.

A convolutional neural network hardware acceleration device, a convolutional calculation method, and a storage medium used in the present embodiment are as described in the specific implementation manner. The descriptions are omitted.

Figure 5:
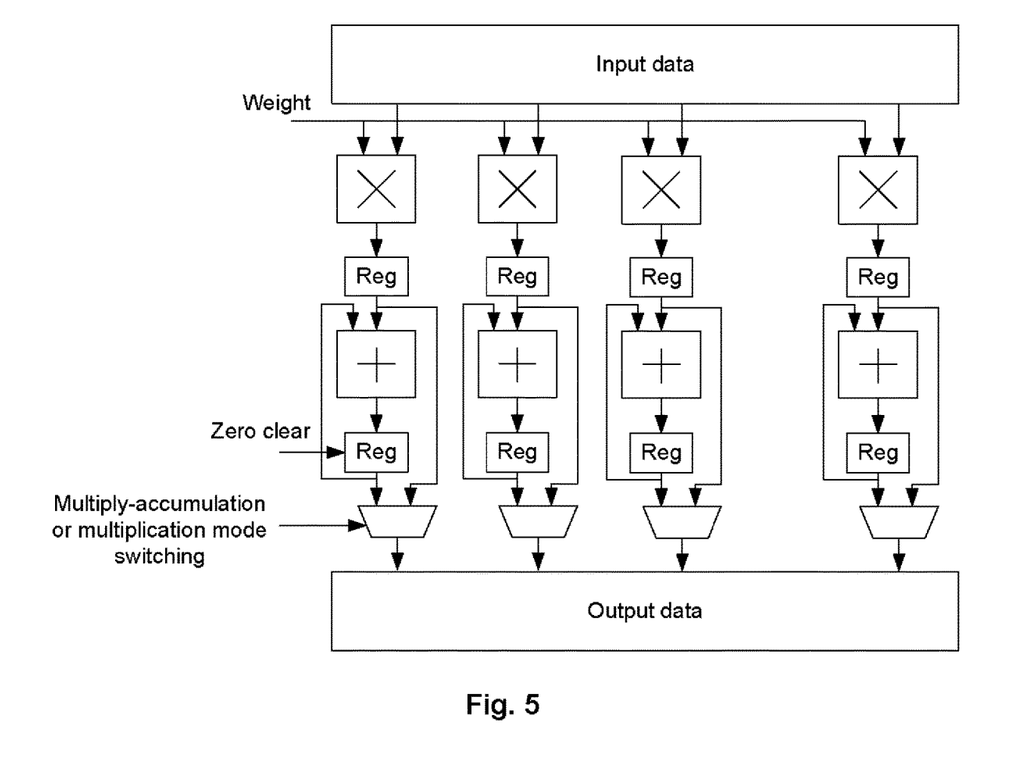
FIG. 5 is a schematic structural diagram of a parallel multiplier or multiply accumulator according to an embodiment of the present disclosure.

FIG. 5 is a schematic structural diagram of a parallel multiplier or multiply accumulator according to an embodiment of the present disclosure. As shown in FIG. 5, the instruction processing element 1 controls the entire data calculation element 22 for parallel multiplication or multiply-accumulation calculation through an instruction decoding result. Then each parallel multiplier or multiply-accumulator 2211 realizes the multiply-accumulate or multiplication operation through the instruction configuration. A temporary storage register reg for storing a temporary value after multiply-accumulation or multiplication operation is contained in the parallel multiplier or multiply-accumulator. An input port of a parallel multiplier is configured by instructions, and operations such as multiplication of vector by scalar are realized.

Figure 6:
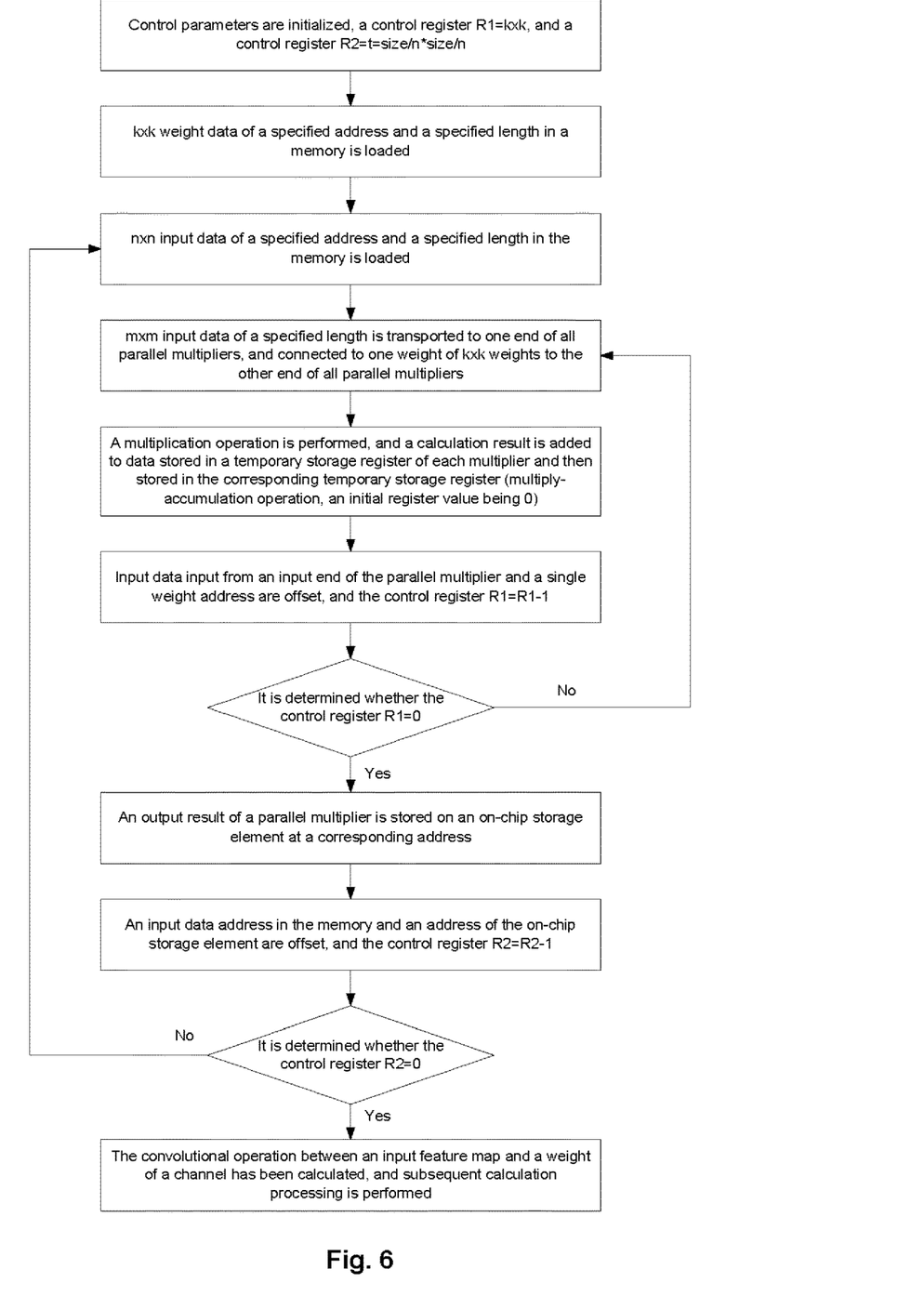
FIG. 6 is a flowchart of convolutional calculation according to an embodiment of the present disclosure.

The specific convolutional calculation process of the present embodiment is detailed as follows. First, the instruction processing element 1 sends the instruction decoding result to the hardware acceleration component, and controls the hardware acceleration component to perform convolutional calculation. FIG. 6 is a flowchart of convolutional calculation according to an embodiment of the present disclosure. As shown in FIG. 6, the process includes the following steps.

It Is supposed that a size of an input feature map loaded is size×size, a weight size is k×k, a sliding step length is 1, and data loaded from a memory each time is n×n, and then t=size/n*size/n loading operations are required. It is supposed that the number of parallel multipliers is m×m, where $n=m+k-1$.

At F1, the data calculation element 22 initializes control parameters. A control register R1=k×k, and a control register R2=t.

At F2, the input buffer element 21 loads k×k weight data of a specified address and a specified length in the external data memory element 3.

At F3, the input buffer element 21 loads n×n input data of a specified address and a specified length in the external data memory element 3.

At F4, the input buffer element 21 transports m×m input data of a specified length to one end of all parallel multipliers, and connects to one weight of k×k weights to the other end of all parallel multipliers.

At F5, the multiplier performs the multiplication operation, and a calculation result is added to data stored in the temporary storage register of each multiplier and then stored in the corresponding temporary storage register (multiply-accumulation operation, an initial register value being 0).

At F6, input data input from an input end of the parallel multiplier and a single weight address are offset, and the control register R1=R1−1, for updating data and weight that need to be input and calculated next time.

At F7, it is determined whether the control register R1 is equal to 0. When the control register R1 is not equal to 0, the method skips to Step S4 to continue the multiply-accumulation operation process of the corresponding input data and single weight. When the control register R1 is equal to 0, each parallel multiplier has calculated the sum of multiply-accumulations of k×k operations of the corresponding input data and weight to obtain a result of a feature point of an output feature map.

At F8, an output result of the parallel multiplier is stored on an on-chip storage element at a corresponding address. At this time, a part of data of the output feature map of a channel is temporarily stored on the on-chip storage element, thereby reducing data interaction between the device and an off-chip memory.

At F9, an input data address in the external data memory element 3 and an address of the on-chip storage element are offset, and the control register R2=R2−1, for updating data in the external data memory element 3 that needs to be loaded next time and a storage position in the on-chip storage element.

At F10, the data calculation element 22 determines whether the control register R2 is equal to 0. When the control register R2 is not equal to 0, the method skips to Step S3 to continue to load new input data from the memory and continue to perform the convolutional operation between the corresponding input data and weight. When the control register R2 is equal to 0, the convolutional operation between an input feature map and a weight of a channel has been calculated, and subsequent calculation processing is performed.

In summary, according to an embedded artificial intelligence instruction set provided by the present disclosure, in conjunction with a hardware device and a storage medium, a convolutional neural algorithm is implemented on embedded hardware, the generality and configurability of the convolutional neural network hardware acceleration device are increased, the convolutional neural network hardware acceleration device is operated through the instruction set, and the problem of redesigning a hardware control logic status machine when the algorithm architecture changes is avoided.

Finally, it should be noted that the above embodiments are examples for clearly illustrating the present disclosure, rather than limiting the implementation manner. It is still within the protection scope of the present disclosure to make other different forms of changes or variations based on the above description.

What is claimed is:

1. A convolutional neural network hardware acceleration device, comprising an instruction processing element, a hardware acceleration component, and an external data memory element, wherein the instruction processing element is configured to decode instructions, and control the hardware acceleration component to perform operations corresponding to decoded instructions;

the hardware acceleration component comprises an input buffer element, an output buffer element, and a data calculation element;

the input buffer element is configured to perform a memory access operation controlled by the instruction processing element to store data read from the external data memory element;

the data calculation element is configured to perform an operational execution operation controlled by the instruction processing element to process a data calculation of an inference part of a convolutional neural network, and control a data calculation process and a data flow direction according to calculation instructions;

the output buffer element is configured to perform a memory access operation controlled by the instruction processing element to store a calculation result which is to be written into the external data memory element and is output by the data calculation element; and the external data memory element is configured to store the calculation result output by the output buffer element and transmit the data to the input buffer element;

wherein the data calculation element comprises at least one calculation element, and the calculation element comprises a multiplier or multiply accumulator, an adder, a subtractor, a divider, a comparator, and an output data selection element, wherein the multiplier or multiply accumulator is configured to implement a multiply-accumulate or multiply operation, and the multiplier or multiply-accumulator comprises a temporary storage register for storing a temporary value after the multiply-accumulate or multiply operation; the adder is configured to implement an addition operation, and the adder comprises a temporary storage register for storing a temporary value after the addition operation; the subtractor is configured to implement a subtraction operation, and the subtractor comprises a temporary storage register for storing a temporary value after the subtraction operation; the divider is configured to implement a division operation, and the divider comprises a temporary storage register for storing a temporary value after the division operation; the comparator is configured to implement a comparison operation, and the comparator comprises a temporary storage register for storing a temporary value after the comparison operation; and the output data selection element is configured to select and output data of one of the multiplier or multiply accumulator, the adder, the subtractor, the divider, and the comparator according to an output data selection signal of a decoding result obtained by the instruction processing element.

2. The device as claimed in claim 1, wherein the instruction processing element comprises:

an instruction queue component, configured to store the instructions;

an instruction fetch component, configured to sequentially fetch the instructions in the instruction queue component;

a decoding component, configured to decode the instructions fetched from the instruction fetch component;
an instruction sequence component, configured to buffer the instructions decoded by the decoding component; and
an execution component, configured to execute the decoded instructions buffered by the instruction sequence component to control the hardware acceleration component to perform corresponding operations.

3. The device as claimed in claim 1, wherein each calculation element is configured to select calculation operations containing at least one of multiply-accumulation, addition, subtraction, multiplication, and division according to an instruction decoding result.

4. A method for convolutional calculation using the convolutional neural network hardware acceleration device as claimed in claim 1, comprising the following steps:
Step S1, decoding, by the instruction processing element, instructions, and sending, by the instruction processing element, decoded instructions to the hardware acceleration component;
Step S2, reading, by the input buffer element, weight data and input data from the external data memory element according to the decoded instructions;
Step S3, transporting, by the input buffer element, the input data to one end of a selected operator of the calculation element and the weight data to the other end of the selected operator according to a selection signal of the calculation element;
Step S4, performing, by the data calculation element, a calculation operation according to the decoded instructions, adding, by the data calculation element, a calculation result of each selected operator to data stored in a temporary storage register of this selected operator to obtain an addition result, and storing, by the data calculation element, the addition result to the corresponding temporary storage register;
Step S5, after the calculation operation performed each selected operator is completed, storing, by an on-chip storage element, a result of one feature point of an output feature map on one channel obtained by the temporary storage register at a corresponding address, and after the calculation operation of each selected operator is completed, a convolutional calculation between the output feature map and a weight of the one channel is completed; and
Step S6, when data of all channels is calculated and stored on the on-chip storage element after the operation of all calculation elements, each of which corresponds to the one channel, is completed, the convolutional calculation of the data of all channels is completed, and storing, by the data calculation element, output data to an external data memory element through the output buffer element.

5. The method as claimed in claim 4, wherein in Step S1, a manner of decoding the instructions by the instruction processing element comprises:
storing, by an instruction queue component, the instructions;
sequentially fetching, by an instruction fetch component, an instruction combination in the instruction queue component according to content of convolutional neural calculation;
decoding, by a decoding component, the instruction combination fetched from the instruction fetch component;
buffering, by an instruction sequence component, decoded instructions in the instruction combination decoded by the decoding component; and
sequentially executing, by an execution component, the decoded instructions buffered by the instruction sequence component, and controlling, by the execution component, the hardware acceleration component to perform operations corresponding to the decoded instructions.

6. The method as claimed in claim 4, wherein in Step S1, the instructions are obtained from an instruction set, the instruction set comprising:
data interaction instructions, which are used for performing data transportation operations comprising data reading, data storage, and data transfer and assignment in a device;
data calculation instructions, which are used for performing data parallel batch calculation operations comprising multiply-accumulation, addition, subtraction, multiplication, and division in a data convolutional calculation process;
control logic instructions, which are used for performing control logic operations to control a data calculation process,
wherein the data interaction instructions, the data calculation instructions, and the control logic instructions form different simple instruction combinations according to different convolutional neural calculations, so as to control the hardware acceleration component performs convolutional calculation.

7. The method as claimed in claim 4, wherein in Step S1, the instruction processing element sends a current instruction, when the current instruction has a dependency relationship with a previous instruction, the current instruction is performed after the previous instruction has been executed, when the instruction queue component is fully buffered, the instruction queue component returns a full writing status to, forbid the instruction fetch component from continuously reading any subsequent instruction, and the instruction fetch component continuously reads the subsequent instruction after the instructions in the instruction queue component are executed;
each instruction in the instruction processing element in Step S1 at least comprises one operation code, one status register, and one operation domain, wherein
the operation code is used for indicating different kinds of operations;
the status register is configured to indicate different operation modes under the same operation code;
the operation domain is represented by an immediate value or a register; and
the operation code, the status register, and the operation domain are sequentially coded into one instruction.

8. A non-transitory storage medium, storing a processor program that, when executed by a computer, implements the following steps:
Step S1, decoding, by the instruction processing element, instructions, and sending, by the instruction processing element, decoded instructions to the hardware acceleration component;
Step S2, reading, by the input buffer element, weight data and input data from the external data memory element according to the decoded instructions;
Step S3, transporting, by the input buffer element, the input data to one end of a selected operator of the calculation element and the weight data to the other end of the selected operator according to a selection signal of the calculation element;

Step S4, performing, by the data calculation element, a calculation operation according to the decoded instructions, adding, by the data calculation element, a calculation result of each selected operator to data stored in a temporary storage register of this selected operator to obtain an addition result, and storing, by the data calculation element, the addition result to the corresponding temporary storage register;

Step S5, after the calculation operation performed each selected operator is completed, storing, by an on-chip storage element, a result of one feature point of an output feature map on one channel obtained by the temporary storage register at a corresponding address, and after the calculation operation of each selected operator is completed, a convolutional calculation between the output feature map and a weight of the one channel is completed; and Step S6, when data of all channels is calculated and stored on the on-chip storage element after the operation of all calculation elements, each of which corresponds to the one channel, is completed, the convolutional calculation of the data of all channels is completed, and storing, by the data calculation element, output data to an external data memory element through the output buffer element.

9. The non-transitory storage medium as claimed in claim 8, wherein in Step S1, a manner of decoding the instructions by the instruction processing element comprises:

storing, by an instruction queue component, the instructions;

sequentially fetching, by an instruction fetch component, an instruction combination in the instruction queue component according to content of convolutional neural calculation;

decoding, by a decoding component, the instruction combination fetched from the instruction fetch component;

buffering, by an instruction sequence component, decoded instructions in the instruction combination decoded by the decoding component; and sequentially executing, by an execution component, the decoded instructions buffered by the instruction sequence component, and controlling, by the execution component, the hardware acceleration component to perform operations corresponding to the decoded instructions, wherein in Step S1, the instruction processing element sends a current instruction, when the current instruction has a dependency relationship with a previous instruction, the current instruction is performed after the previous instruction has been executed, when the instruction queue component is fully buffered, the instruction queue component returns a full writing status to, forbid the instruction fetch component from continuously reading any subsequent instruction, and the instruction fetch component continuously reads the subsequent instruction after the instructions in the instruction queue component are executed;

in Step S1, the instructions are obtained from an instruction set, the instruction set comprising:

data interaction instructions, which are used for performing data transportation operations comprising data reading, data storage, and data transfer and assignment in a device;

data calculation instructions, which are used for performing data parallel batch calculation operations comprising multiply-accumulation, addition, subtraction, multiplication, and division in a data convolutional calculation process;

control logic instructions, which are used for performing control logic operations to control a data calculation process, wherein the data interaction instructions, the data calculation instructions, and the control logic instructions form different simple instruction combinations according to different convolutional neural calculations, so as to control the hardware acceleration component performs convolutional calculation;

each instruction in the instruction processing element in Step S1 at least comprises one operation code, one status register, and one operation domain, wherein the operation code is used for indicating different kinds of operations;

the status register is configured to indicate different operation modes under the same operation code;

the operation domain is represented by an immediate value or a register; and the operation code, the status register, and the operation domain are sequentially coded into one instruction.

* * * * *